(12) United States Patent
Lopez-Crevillen et al.

(10) Patent No.: US 8,166,939 B2
(45) Date of Patent: May 1, 2012

(54) CAM BEARING SURFACE OF AN ENGINE CYLINDER HEAD THAT INCLUDES AN AXIALLY EXTENDING OIL PASSAGE

(75) Inventors: Jose Manuel Lopez-Crevillen, Farmington Hills, MI (US); Robert J. Moran, Ann Arbor, MI (US); Gregory J Tomkiewicz, Milford, MI (US)

(73) Assignee: GM Global Technology Operations LLC

( * ) Notice: Subject to any disclaimer, the term of this patent is extended or adjusted under 35 U.S.C. 154(b) by 497 days.

(21) Appl. No.: 12/398,522

(22) Filed: Mar. 5, 2009

(65) Prior Publication Data
US 2010/0223787 A1 Sep. 9, 2010

(51) Int. Cl.
*F01M 9/10* (2006.01)
(52) U.S. Cl. ............... 123/90.34; 123/90.33; 29/888.06
(58) Field of Classification Search ............. 29/898.042, 29/898.06–898.075, 557, 558; 123/90.33–90.38
See application file for complete search history.

(56) References Cited

U.S. PATENT DOCUMENTS

| | | | | |
|---|---|---|---|---|
| 1,624,497 A * | 4/1927 | McAllister | ............... | 123/90.36 |
| 1,701,563 A * | 2/1929 | Griswold | ............... | 123/90.36 |
| 4,199,202 A * | 4/1980 | Maeda | ............... | 384/432 |
| 4,537,166 A * | 8/1985 | Kimura et al. | ............... | 123/90.36 |
| 4,553,510 A * | 11/1985 | Yano et al. | ............... | 123/90.34 |
| 4,621,597 A * | 11/1986 | Kawada et al. | ............... | 123/90.27 |
| 4,688,523 A * | 8/1987 | Takahashi et al. | ............... | 123/41.32 |
| 4,688,524 A * | 8/1987 | Takahashi | ............... | 123/41.32 |
| 4,729,349 A * | 3/1988 | Sonoda et al. | ............... | 123/90.34 |
| 4,754,540 A * | 7/1988 | Suica et al. | ............... | 29/416 |
| 4,754,729 A * | 7/1988 | Abe et al. | ............... | 123/90.38 |
| 4,773,361 A * | 9/1988 | Toki et al. | ............... | 123/90.23 |
| 4,856,466 A * | 8/1989 | Ting et al. | ............... | 123/90.33 |
| 4,915,066 A * | 4/1990 | Koshimoto et al. | ............... | 123/90.27 |
| 5,038,732 A * | 8/1991 | Matayoshi et al. | ............... | 123/193.5 |
| 5,143,034 A * | 9/1992 | Hirose | ............... | 123/196 R |
| 5,186,130 A * | 2/1993 | Melchior | ............... | 123/90.35 |
| 5,452,690 A * | 9/1995 | Kobayashi | ............... | 123/90.38 |
| 5,507,259 A * | 4/1996 | Tanaka | ............... | 123/196 M |
| 5,535,714 A * | 7/1996 | Aoyama et al. | ............... | 123/193.5 |
| 5,566,652 A * | 10/1996 | Deppe | ............... | 123/90.35 |
| 5,645,022 A * | 7/1997 | Yamamoto et al. | ............... | 123/90.17 |
| 5,755,194 A * | 5/1998 | Moorman et al. | ............... | 123/196 W |
| 5,800,902 A * | 9/1998 | Shimmell et al. | ............... | 428/139 |
| 5,803,031 A * | 9/1998 | Moriya | ............... | 123/90.17 |
| 5,913,292 A * | 6/1999 | Takemura et al. | ............... | 123/90.17 |
| 6,146,021 A * | 11/2000 | Ward | ............... | 384/492 |
| 6,209,509 B1 * | 4/2001 | Kammeraad et al. | ............... | 123/196 R |

(Continued)

FOREIGN PATENT DOCUMENTS

JP 06323117 A * 11/1994

(Continued)

*Primary Examiner* — David Bryant
*Assistant Examiner* — Jason L Vaughan
(74) *Attorney, Agent, or Firm* — Harness, Dickey & Pierce, P.L.C.

(57) ABSTRACT

A method of forming a cylinder head may include machining an upper surface of a cam tower of the cylinder head to form a generally planar surface. An oil passage may be drilled in the upper surface to provide an oil feed. A bearing bore may be formed in the upper surface of the cam tower. The bearing bore may include a recess having first and second circumferential ends. The oil passage may intersect the first circumferential end.

12 Claims, 5 Drawing Sheets

U.S. PATENT DOCUMENTS

| | | | |
|---|---|---|---|
| 6,295,963 B1 * | 10/2001 | Kollock et al. | 123/193.5 |
| 6,338,324 B1 * | 1/2002 | Tanaka et al. | 123/90.34 |
| 6,438,835 B1 * | 8/2002 | Chancey | 29/888.06 |
| 6,470,846 B1 * | 10/2002 | Kammeraad et al. | 123/196 R |
| 6,505,588 B2 * | 1/2003 | Dietz | 123/90.17 |
| 6,729,284 B2 * | 5/2004 | Lunsford | 123/90.33 |
| 6,920,856 B2 * | 7/2005 | Lee | 123/90.34 |
| 7,107,950 B2 * | 9/2006 | Arinaga et al. | 123/90.16 |
| 7,201,622 B2 * | 4/2007 | Hoi | 440/52 |
| 7,322,327 B1 * | 1/2008 | Kim et al. | 123/90.34 |
| 7,395,802 B2 * | 7/2008 | Riley et al. | 123/196 R |
| 7,434,572 B2 * | 10/2008 | Hutter et al. | 123/572 |
| 7,673,604 B2 * | 3/2010 | Takane et al. | 123/90.34 |
| 2004/0211385 A1 * | 10/2004 | Lee | 123/193.5 |
| 2007/0283912 A1 * | 12/2007 | Reinhart et al. | 123/90.34 |
| 2008/0170816 A1 * | 7/2008 | Ueno et al. | 384/418 |
| 2008/0264366 A1 * | 10/2008 | Hashimoto | 123/90.17 |
| 2009/0301418 A1 * | 12/2009 | Arinaga et al. | 123/90.17 |
| 2010/0319637 A1 * | 12/2010 | Ito et al. | 123/41.01 |

FOREIGN PATENT DOCUMENTS

JP       07102929 A  *  4/1995

* cited by examiner

CAM BEARING SURFACE OF AN ENGINE CYLINDER HEAD THAT INCLUDES AN AXIALLY EXTENDING OIL PASSAGE

FIELD

The present disclosure relates to engine cylinder head geometry and manufacturing.

BACKGROUND

This section provides background information related to the present disclosure which is not necessarily prior art.

Engine assemblies may include bearing support surfaces for rotating engine components. For example, a cylinder head may include cam towers having recesses formed therein defining lower portions of cam bearings. An oil passage may be formed in the cylinder head and may extend through the recesses to provide oil to lubricate an interface between a camshaft and the cam bearings. Additional oil grooves may be formed in the recesses to provide proper lubrication to the cam bearings.

SUMMARY

This section provides a general summary of the disclosure, and is not comprehensive of its full scope or all of its features.

A method of forming a cylinder head may include machining an upper surface of a cam tower of the cylinder head to form a generally planar surface. An oil passage may be drilled in the upper surface to provide an oil feed. A bearing bore may be formed in the upper surface of the cam tower. The bearing bore may include a recess having first and second circumferential ends. The oil passage may intersect the first circumferential end.

An engine assembly may include a cylinder head and a camshaft. The cylinder head may define a cam bearing recess, a generally planar cam bearing cap mounting surface extending outward from a first end of the cam bearing recess, and an axially extending drilled oil passage providing fluid communication between the cam bearing recess and an oil source. The camshaft may be rotatably supported on the cam bearing recess. The oil passage may include a first radial portion extending through the cam bearing recess and a second radial portion extending through the mounting surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only and are not intended to limit the scope of the present disclosure in any way.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Figure 1:
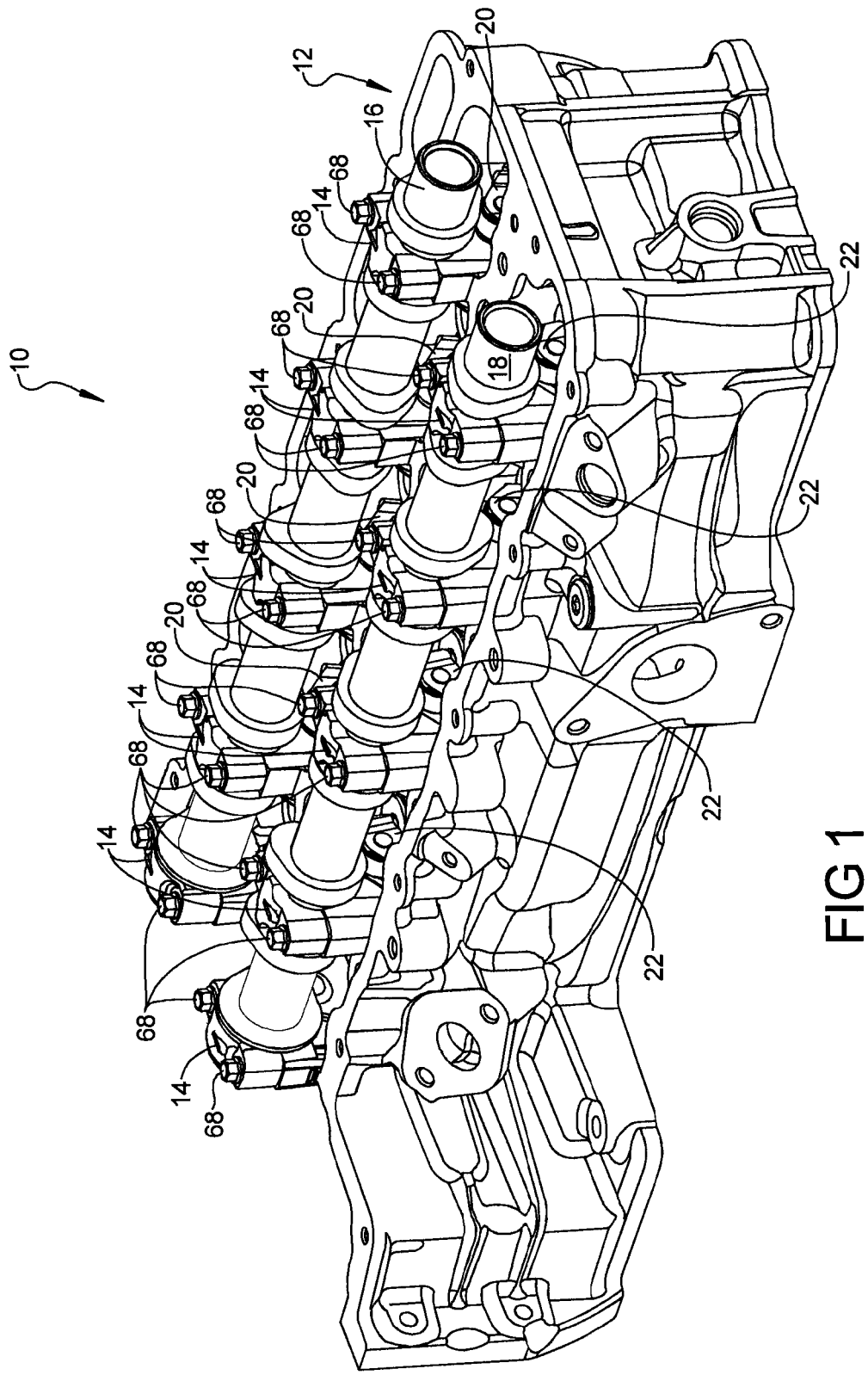
FIG. 1 is a perspective view of an engine assembly according to the present disclosure.

Referring now to FIG. 1, a portion of an engine assembly 10 is illustrated including a cylinder head 12, cam bearing caps 14, intake and exhaust camshafts 16, 18, and intake and exhaust valve actuation mechanisms 20, 22. While the engine assembly 10 is illustrated as a dual overhead camshaft configuration, it is understood that the present teachings are in no way limited to such a configuration and may apply equally to a variety of other engine configurations including, but not limited to, single overhead cam engines.

Figure 4:
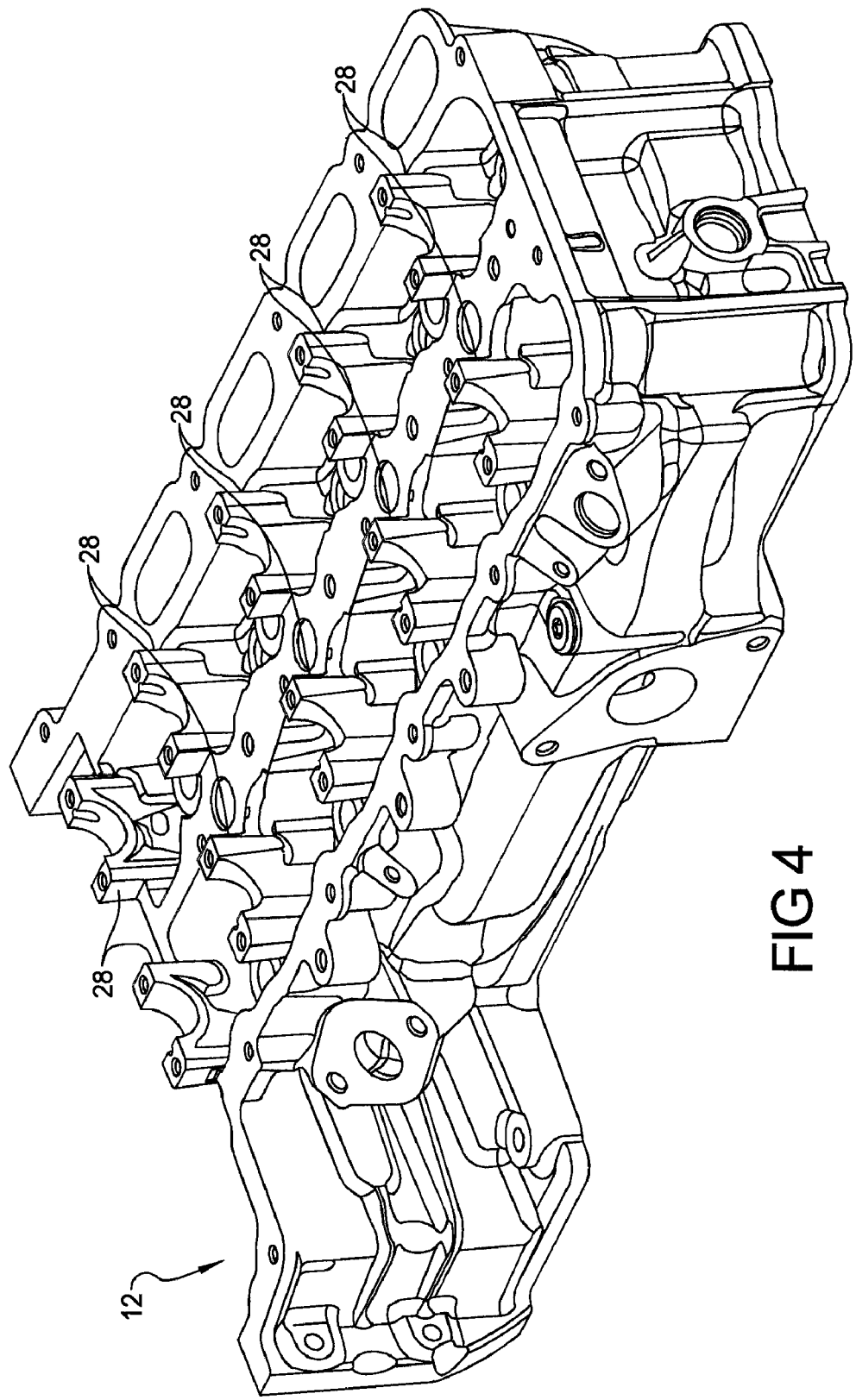
FIG. 4 is a perspective view of the cylinder head of the engine assembly of FIG. 1 in third state.
Figure 5:
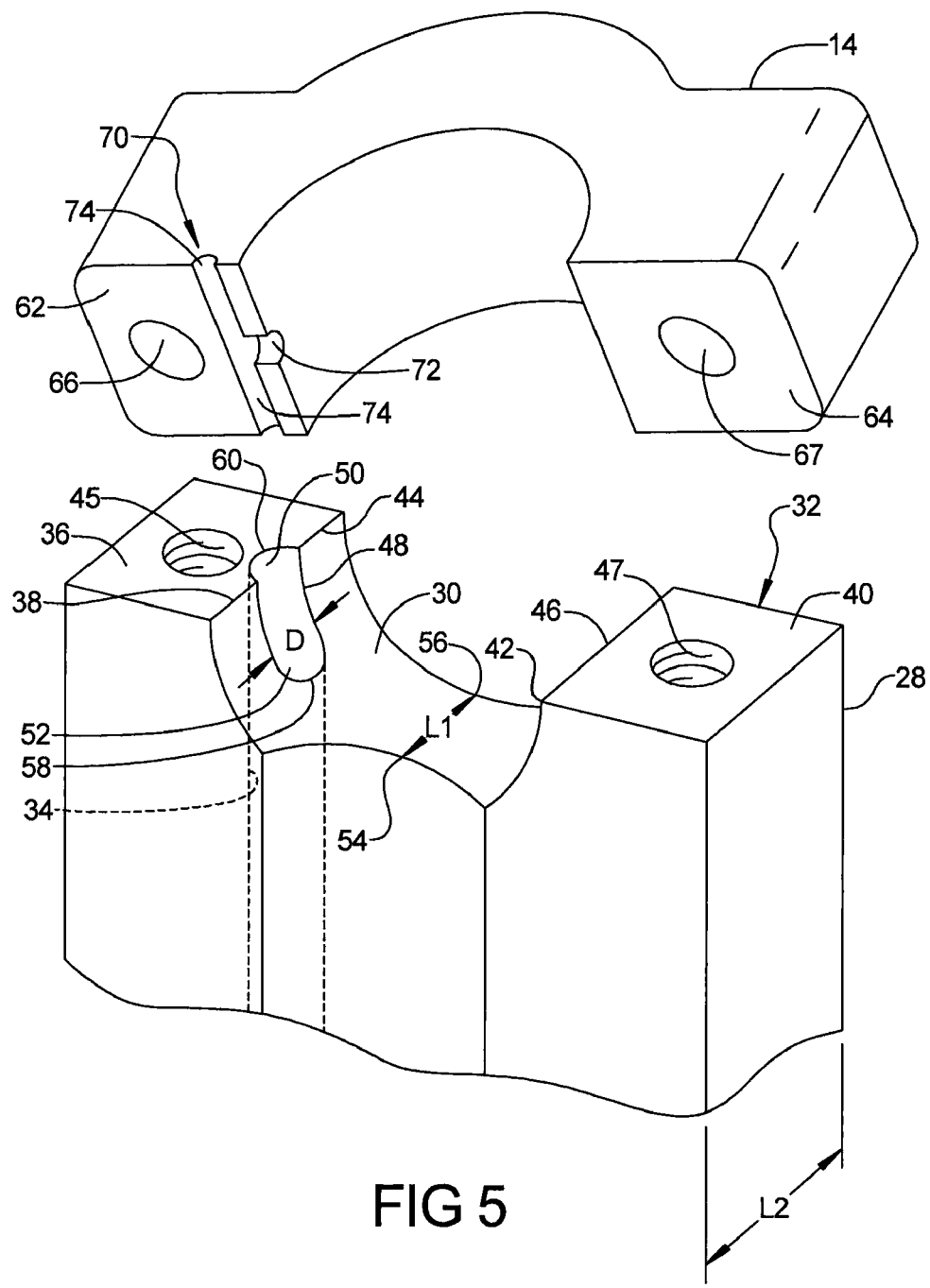
FIG. 5 is a fragmentary perspective exploded view of a cam bearing cap and cam tower of the engine assembly of FIG. 1.

With additional reference to FIGS. 4 and 5, the cylinder head 12 may include cam towers 28. Each of the cam towers 28 may include a recess 30, a mounting surface 32, and a drilled oil passage 34. The recesses 30 may cooperate with the cam bearing caps 14 to define cam bores. The mounting surface 32 may include a first portion 36 extending from a first end 38 of the recess 30 and a second portion 40 extending from a second end 42 of the recess 30. A first edge 44 may be defined between the first portion 36 and the first end 38 and a second edge 46 may be defined between the second portion 40 and the second end 42. A first threaded aperture 45 may extend into the first portion 36 and a second threaded aperture 47 may extend into the second portion 40.

The drilled oil passage 34 may define an oil groove 48 in the recess 30. The drilled oil passage 34 may extend through the first portion 36 of the mounting surface 32 and the first end 38 of the recess 30. More specifically, the drilled oil passage 34 may extend through the first edge 44. The first edge 44 may separate the drilled oil passage 34 into first and second radial portions 50, 52. The first radial portion 50 may form an oil feed for lubricating the intake and exhaust valve actuation mechanisms 20, 22, as discussed below, and the second radial portion 52 may form the oil groove 48 providing lubrication for the interface between the cam bores and the intake and exhaust camshafts 16, 18.

The cam towers 28 may each include a reduced axial thickness region 54 at a location corresponding to a base 56, or lower region, of the recess 30. The reduced axial thickness region 54 may generally provide for weight reduction in the cylinder head 12. As discussed above, the drilled oil passage 34 may extend through the first edge 44 and may be offset from the base 56 of the cam tower 28. The offset location of the drilled oil passage 34 may generally allow the formation of the reduced axial thickness region 54. By way of non-limiting example, the reduced axial thickness region 54 may have an axial thickness (L1) of less than twice the diameter (D) of the drilled oil passage 34 and less than an axial thickness (L2) of the mounting surface 32. Since the drilled oil passage 34 forms the oil groove 48, the oil groove 48 may have an axial thickness equal to the diameter (D) of the drilled oil passage 34. The oil groove 48 may be rotationally offset from the reduced axial thickness region 54.

By way of non-limiting example, the oil passage 34 may include first and second points 58, 60 along a circumference thereof. The first point 58 may form an axial starting point of the oil groove 48 and the second point 60 may form an axial ending point of the oil groove 48. The first point 58 may be located at least forty-five degrees from the base 56. The second point 60 may be located approximately ninety degrees from the base 56. The first point 58 may be located generally opposite the second point 60 along the circumference of the oil passage 34. More specifically, and by way of non-limiting example, the first and second points 58, 60 may be located approximately one hundred and eighty degrees from one another. The first and second points 58, 60 may be axially offset from one another along the axial extent of the oil passage 34.

As seen in FIGS. 1 and 5, the cam bearing caps 14 may each include first and second mounting portions 62, 64. The first mounting portion 62 may include a first aperture 66 receiving a fastener 68 engaged with the first threaded aperture 45 and the second mounting portion 64 may include a second aperture 67 receiving a fastener 68 engaged with the second threaded aperture 47. The first mounting portion 62 may abut the first portion 36 of the mounting surface 32 and the second mounting portion 64 may abut the second portion 40 of the mounting surface 32.

The first mounting portion 62 may include an oil passage 70 in fluid communication with the drilled oil passage 34. The oil passage 70 may include an inlet 72 in direct fluid communication with the drilled oil passage 34 and outlets 74 extending generally parallel to the intake and exhaust camshafts 16, 18. The oil passage 70 may target oil flow to intake and exhaust valve actuation mechanisms 20, 22 to provide lubrication to the intake and exhaust valve actuation mechanisms 20, 22.

Figure 2:
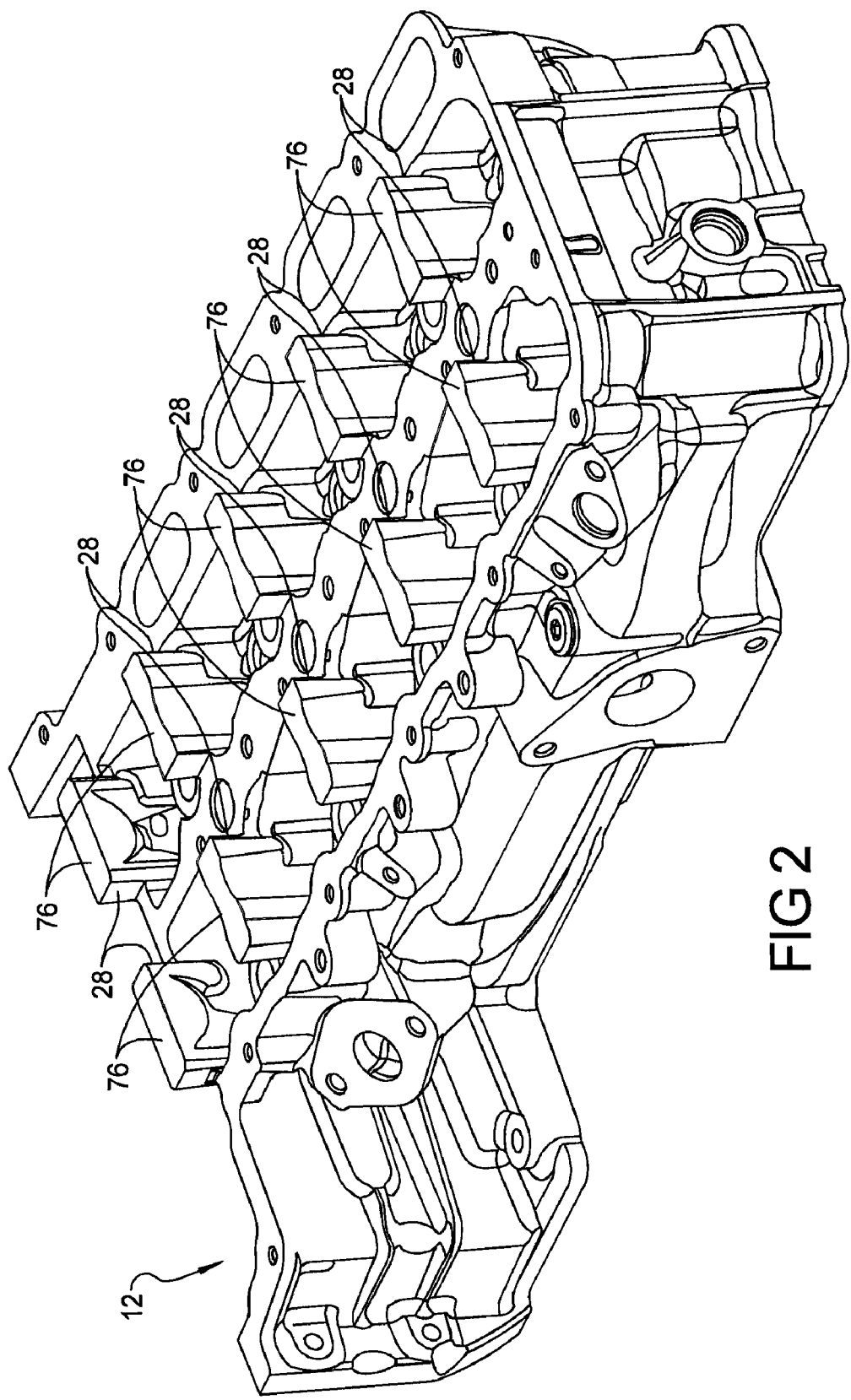
FIG. 2 is a perspective view of the cylinder head of the engine assembly of FIG. 1 in a first state.
Figure 3:
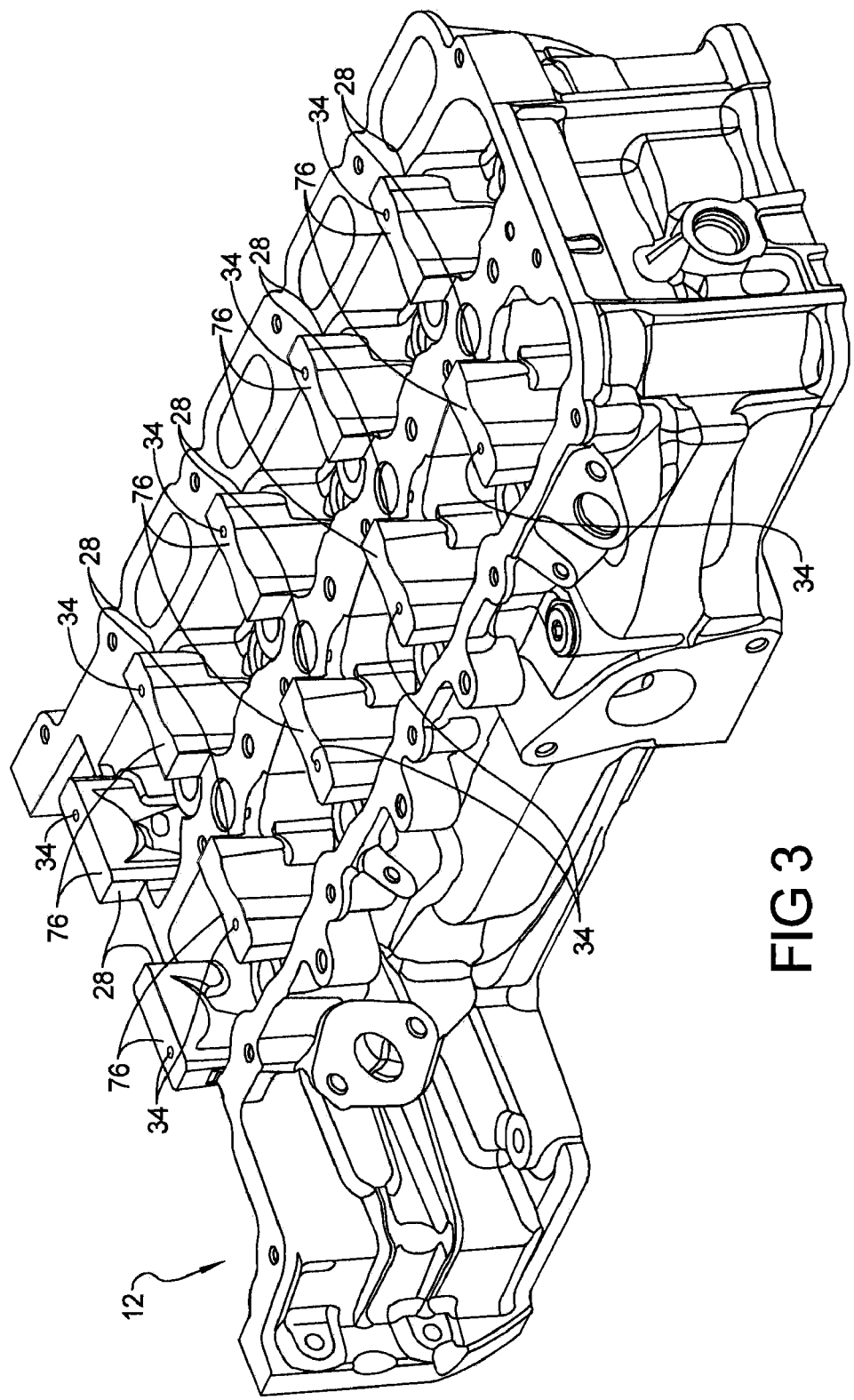
FIG. 3 is a perspective view of the cylinder head of the engine assembly of FIG. 1 in a second state.

The cylinder head 12 may be formed as a casting and machined to the final state, as seen in FIG. 4. The cylinder head 12 is illustrated in a first state in FIG. 2 where the initial cylinder head casting has been machined to provide generally planar upper surfaces 76 on the cam towers 28. The cylinder head 12 is illustrated in a second state in FIG. 3 where the oil passages 34 have been drilled into the generally planar upper surfaces 76 on the cam towers 28. The oil passages 34 may be drilled generally perpendicular to the generally planar upper surfaces 76. Once the oil passages 34 have been drilled, the recesses 30 may be formed in the cam towers 28.

The recesses 30 may be formed from a machining process. By way of non-limiting example, the recesses 30 may be formed by milling the cam towers 28. As the recesses 30 are formed, the oil grooves 48 may be formed. More specifically, the oil grooves 48 may be formed by exposing a portion of the oil passages 34 along their axial extent during the forming of the recesses, eliminating additional processes for forming the oil grooves 48.

More specifically, and by way of non-limiting example, the outer radial extent of the recess 30 may intersect and eliminate a portion of the cam tower 28 that defines a wall for the oil passage 34. The angular extent of the oil groove 48 defined by the oil passage 34 and the recess 30 may be defined by the degree of intersection between the recess 30 and the oil passage 34.

What is claimed is:

1. A cylinder head comprising:
   a cam bearing recess defining a cam bearing surface;
   a generally planar cam bearing cap mounting surface extending outward from a first end of the cam bearing recess with an edge being defined between the first end of the cam bearing recess and the mounting surface;
   an axially extending drilled oil passage providing fluid communication between the cam bearing recess and an oil source, the oil passage intersecting the edge and including a first radial portion extending through the recess and a second radial portion extending through the mounting surface with the edge dividing the oil passage into the first and second radial portions;
   wherein the cam bearing recess includes a reduced axial thickness region at a base of the recess, the reduced axial thickness region having an axial thickness less than twice a diameter of the drilled oil passage; and
   wherein the first radial portion defines an oil groove in the cam bearing recess and the oil groove extends along the cam bearing surface from the edge and terminating at a point between the edge and the reduced axial thickness region of the base.

2. The cylinder head of claim 1, wherein the first radial portion defines an oil groove in the cam bearing recess.

3. The engine assembly of claim 2, wherein the oil groove extends from the edge along the cam bearing surface and terminates at a point between the edge and a base of the cam bearing surface, the base defining a lowermost region of the cam bearing surface and the point being rotationally offset from the base along the cam bearing surface by at least 45 degrees in a rotational direction from the base to the edge.

4. The cylinder head of claim 1, wherein the oil passage extends generally perpendicular to the mounting surface.

5. An engine assembly comprising:
   A cylinder head comprising:
      a cam bearing recess defining a cam bearing surface;
      a generally planar cam bearing cap mounting surface extending outward from a first end of the cam bearing recess with an edge being defined between the first end of the cam bearing recess and the mounting surface;
   an axially extending drilled oil passage providing fluid communication between the cam bearing recess and an oil source, the oil passage intersecting the edge and including a first radial portion extending through the recess and a second radial portion extending through the mounting surface with the edge dividing the oil passage into the first and second radial portions;
   a camshaft rotatably supported on the cam bearing recess;
   wherein the cam bearing recess includes a reduced axial thickness region at a base of the recess, the reduced axial thickness region having an axial thickness less than twice a diameter of the drilled oil passage; and
   wherein the first radial portion defines an oil groove in the cam bearing recess and the oil groove extends along the cam bearing surface from the edge and terminating at a point between the edge and the reduced axial thickness region of the base.

6. The engine assembly of claim 5, wherein the first radial portion defines an oil groove in the cam bearing recess.

7. The engine assembly of claim 6, wherein the oil groove extends from the edge along the cam bearing surface and terminates at a point between the edge and a base of the cam bearing surface, the base defining a lowermost region of the cam bearing surface and the point being rotationally offset from the base along the cam bearing surface by at least 45 degrees in a rotational direction from the base to the edge.

8. The engine assembly of claim 5, further comprising a cam bearing cap secured to the cam bearing cap mounting surface of the cylinder head, the cam bearing cap including an oil groove overlying the second radial portion of the oil passage.

9. The engine assembly of claim 5, wherein the oil passage extends generally perpendicular to the mounting surface.

10. An engine assembly comprising:
    a cylinder head including:
       a cam bearing recess defining a cam bearing surface with a reduced axial thickness region at a base of the recess, the base defining a lowermost region of the recess; a generally planar cam bearing cap mounting surface extending outward from a first end of the cam bearing recess with an edge being defined between the first end of the cam bearing recess and the mounting surface; and an axially extending drilled oil passage providing fluid communication between the cam bearing recess and an oil source, the oil passage intersecting the edge and including a first radial portion extending through the recess and a second radial portion extending through the mounting surface with the edge dividing the oil passage into the first and second radial portions, the oil passage being offset from the reduced axial thickness region with the first radial portion defining an oil groove in the cam bearing recess that extends from the edge along the cam bearing surface and terminates at a point between the edge and a base of the cam bearing surface, the point being rotationally offset from the base along the cam bearing surface by at least 45 degrees in a rotational direction from the base to the edge and the reduced axial thickness region having an axial thickness less than twice a diameter of the drilled oil passage;

and a camshaft rotatably supported on the cam bearing recess.

11. The engine assembly of claim 10, further comprising a cam bearing cap secured to the cam bearing cap mounting surface of the cylinder head, the cam bearing cap including an oil groove overlying the second radial portion of the oil passage.

12. The engine assembly of claim 10, wherein the oil passage extends generally perpendicular to the mounting surface.

* * * * *